Figure 1:
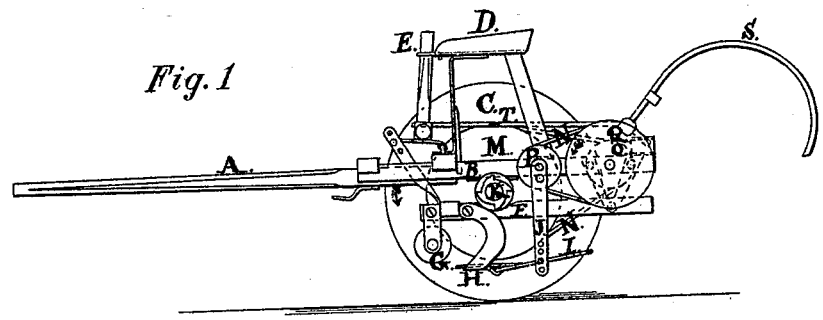
Figure 2:
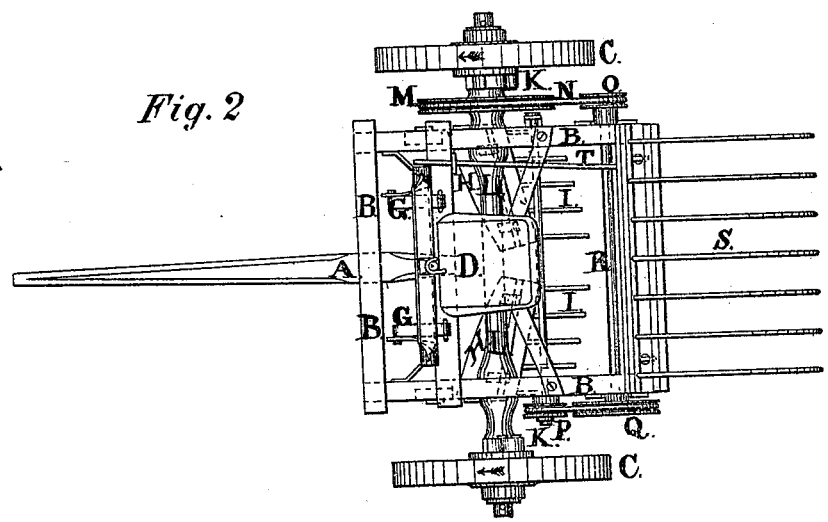
Figure 3:
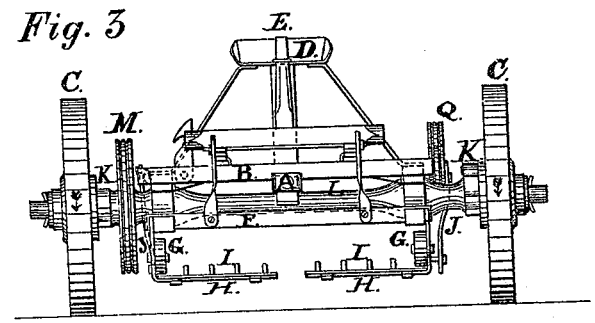

I. BENTLY.
BEAN-HARVESTER.

No. 175,645.  Patented April 4, 1876.

Witnesses  
Ephraim Britton  
G. M. Westland

Inventor  
Ira Bently

UNITED STATES PATENT OFFICE.

IRA BENTLEY, HOWARD TOWNSHIP, COUNTY OF KENT, CANADA.

IMPROVEMENT IN BEAN-HARVESTERS.

Specification forming part of Letters Patent No. 175,645, dated April 4, 1876; application filed August 25, 1875.

*To all whom it may concern:*

Be it known that I, IRA BENTLEY, of the township of Howard, in the county of Kent, in the Province of Ontario and the Dominion of Canada, farmer, have invented new and useful Improvements in a Machine for Pulling or Removing Beans from the Ground, for which Letters Patent were granted me by the Hon. Commissioner of Patents for the Dominion of Canada on the 13th day of November, 1872, numbered 1855, which improvements are fully set forth in the following specification, reference being had to the accompanying drawing.

The object of my invention is to rapidly and thoroughly detach the beans from the place where they grow in the ground, cleanse them from surrounding earth or dirt, and deposit them on the ground in a fit and proper position for being gathered in or harvested, in a much more expeditious and careful manner than the present mode of pulling the same by hand or manual labor, by the combination of the shovels, screen, drive-wheel, dogs, pitmen, connecting-rod between pitmen, bed piece or frame, lever, gage-wheels, and gearing, as shown in the perspective view, Figure I, of the accompanying drawing.

The machine is illustrated more in detail in the plan view, Fig. II, and the vertical view, Fig. III.

A is the pole for a team of horses, which, when walking in the furrows, have two rows of beans between them. B is the frame, supporting driver's seat, &c. C C are the wheels supporting machine, directly in rear of each horse. D is the driver's seat. E is the lever attached to and raising or lowering F, the bed-piece, at will of driver; G G, gage-wheels. H H are the iron or steel pointed shovels attached to F, rearwardly inclined toward each other, as shown, and situated far enough apart to permit of each working on a separate hill or row; I I, iron screens or vibrators attached to rear of H H, moving alternately up and down by the pitmen J J, which are attached to and worked as hereinafter mentioned. K K are two dogs or brakes, one on the inner limb of each wheel C C, and acting upon the movable axle-tree L. M is a drive-wheel, firmly fastened to and controlled by L. N N is gearing; O and P, two small wheels, operated through gearing; Q, wheel at rear of frame on the left side, connected with O by rod R. S is a movable rake, under control of driver by lever T.

As the machine is drawn forward the wheels C C, through the action of K K, cause L to revolve. L operates in a similar manner upon M, the gearing upon which causes O, P, and Q to revolve in a forward direction. The pitmen J J, being acted upon by P, cause I I to vibrate very rapidly. As the machine proceeds the shovels H H detach the beans completely from the ground. As they are detached the forward action of the machine causes them to be brought upon the vibrators I I, which, in consequence of the above-mentioned process, are vibrating very rapidly and forcibly. This motion of I I completely removes and separates the dirt or earth from the beans, leaving them lying upon the surface of the earth in a natural position, and more free from incurring injury through stress of weather or rain than if they had been pulled or gathered by hand-process. With the aid of S the beans can be raked into convenient stacks for the purpose of harvesting the same. Under this process beans can be gathered at a great saving of time and money.

I am aware that the lever E, the bed-piece F, the gage-wheels G G, the shovels H H, the pitmen J J, the dogs or brakes K K, the drive-wheel M, the gearing N N, the wheels O, P, and Q, the rods R R, the rake S, and the lever T are not severally new, and I do not claim them or any of them.

What I claim as my invention is—

The shovels H, rigidly secured to the adjustable bed-piece F at each side thereof, and inclining rearwardly toward each other, in combination with the alternately-vibrating screens I, substantially as and for the purpose hereinbefore set forth.

IRA BENTLEY.

Witnesses:
 EPHRAIM BRITTON,
 G. M. WESTLAND.